United States Patent [19]

Sadler

[11] Patent Number: 5,586,702

[45] Date of Patent: Dec. 24, 1996

[54] VEHICLE CARGO CARRIER

[76] Inventor: William R. Sadler, 1520 Edgewood Dr., Altoona, Wis. 54720

[21] Appl. No.: 421,049

[22] Filed: Apr. 12, 1995

[51] Int. Cl.[6] .............................. B60R 7/00; B60R 7/10; B60R 9/00; B60R 11/00

[52] U.S. Cl. .......................... 224/521; 224/281; 224/282; 224/488; 224/495; 224/512; 224/519; 280/186; 403/377; 403/378

[58] Field of Search .................................... 224/281, 282, 224/488, 495, 511, 512, 518, 519, 520, 521, 503, 509, 510, 526, 527, 491, 492, 496, 523, 524; 414/462; 280/186, 769; 403/292, 300, 306, 376, 377, 378

[56] References Cited

U.S. PATENT DOCUMENTS

| | | | |
|---|---|---|---|
| 3,163,339 | 12/1964 | Merchant | 224/547 |
| 4,369,902 | 1/1983 | Lampeas | 224/510 |
| 4,671,439 | 6/1987 | Groeneweg | 224/42.03 A |
| 4,744,590 | 5/1988 | Chesney | 224/526 |
| 5,029,740 | 7/1991 | Cox | 224/521 |
| 5,038,983 | 8/1991 | Tomososki | 224/42.43 |
| 5,224,636 | 7/1993 | Bounds | 224/521 |
| 5,232,135 | 8/1993 | Marren | 224/510 |
| 5,310,100 | 5/1994 | Liscinsky | 224/521 |
| 5,360,150 | 11/1994 | Praz | 224/281 |

*Primary Examiner*—Henry J. Recla
*Assistant Examiner*—Timothy L. Maust
*Attorney, Agent, or Firm*—Joel D. Skinner, Jr.

[57] ABSTRACT

A vehicle cargo carrier for storing and transporting luggage, gear, equipment and the like on the exterior of a vehicle. The carrier is attached to a common trailer hitch and is particularly well suited for use with a mini-van or sport utility vehicle which has a rear opening door or hatch. The carrier is slideably moveable, permitting outward extension, while still being connected to the vehicle, to provide easy access to and unobstructed opening of the vehicle rear door or hatch, and to provide unobstructed access to the vehicle's existing interior cargo area. Subsequently, the carrier is inwardly slidably retracted so that it is firmly disposed in an aerodynamically favorable position proximate the rear of the vehicle. The carrier comprises a connection member which interfaces with the hitch, a frame member which interfaces with the connection member, and a storage box or container member which is connected to the frame member.

17 Claims, 4 Drawing Sheets

5,586,702

VEHICLE CARGO CARRIER

BACKGROUND OF THE INVENTION

1. Field of the Invention

This invention relates to vehicular storage apparatus, and more particularly to a cargo or luggage carrier for attachment to the exterior of a vehicle. The carrier of this invention is particularly useful with mini-vans or sport utility vehicles when attached to a standard tow or trailer hitch or attachment thereon.

2. Background Information

In the past, various devices have been used and/or proposed to carry cargo such as luggage on the exterior of a vehicle. However, these devices have significant limitations and shortcomings.

U.S. Pat. No. 5,038,983 to Tomososki discloses a vehicle cargo carrier attachment which is connectable to a common trailer hitch. The carrier includes a fixed bracket supporting a cargo box. U.S. Pat. No. 4,671,439 to Groeneweg discloses a luggage carrier apparatus for a vehicle. A mounting apparatus telescopingly connects the carrier to a mini-van frame.

Despite the need in the art for a cargo carrier which overcomes the disadvantages, shortcomings and limitations of the prior art, none insofar as is known has been developed or proposed.

Accordingly, it is an object of the present invention to provide an improved cargo carrier for vehicles. It is a further object of this invention to provide a cargo carrier which is attachable via a common vehicle hitch system, which is easily attachable and detachable, which is easily accessible, which permits easy access to and operation of the rear door or hatch of the vehicle (and the interior vehicle cargo area), which has an aerodynamically favorable design and is conveyed in an aerodynamically favorable position with respect to the vehicle with which it is conveyed, and which overcomes the limitations and shortcomings of the prior art.

SUMMARY OF THE INVENTION

The apparatus of the present invention provides a vehicle cargo carrier for storing and transporting luggage, gear, equipment and the like on the exterior of a vehicle.

In a basic aspect, the invention provides a cargo carrier for attachment to the rear portion of a vehicle via a trailer hitch, comprising:

(a) a connection member for attachment to the vehicle trailer hitch, the connection member having a predetermined configuration;

(b) a frame member slidably attached to the connection member; and (c) a box member attached to the frame member.

In a preferred embodiment, the invention provides a cargo carrier for attachment to the rear portion of a vehicle via a receiver-type trailer hitch having a rectilinear tubular configuration with an open central channel, comprising:

(a) a connection member for attachment to the vehicle trailer hitch, the connection member having a straight bar structure of a predetermined length and having a proximal end for insertion into vehicle trailer hitch channel and an opposing distal end, the bar structure having predetermined outside dimensions which are substantially equivalent to inside dimensions of the trailer hitch channel;

(b) a frame member slidably attached to the connection member, the frame member including a receiving member which is telescopingly slidably connected to the connection member and a box support member attached to the receiving member, the receiving member having a straight bar structure of a predetermined length and having a proximal end for sliding insertion over the connection member and an opposing distal end, the bar structure having predetermined inside dimensions which are substantially equivalent to outside dimensions of the connection member; and (c) a box member attached to the box support member, the box member having predetermined dimensions and including a body and a rear opening top lid pivotally attached thereto.

The features, benefits and objects of this invention will become clear to those skilled in the art by reference to the following description, claims and drawings.

DESCRIPTION OF THE PREFERRED EMBODIMENTS

The vehicle cargo carrier 10 of the present invention is useful for storing and transporting luggage, gear, equipment and the like on the exterior of a vehicle, thus conserving interior vehicle space increasing useful vehicle storage capability and enabling improved interior cleanliness. The carrier 10 is attached to a common receiver-style trailer hitch and is particularly well suited for use with a mini-van or sport utility vehicle which has a rear door or hatch. Such vehicles pose problems for prior art carriers because the rear doors or hatches open outwardly and are blocked by such carriers. The carrier 10 is equally well suited for use with automobiles (to provide access to the trunk) of a variety of makes and models so long as they are equipped with a hitch. The carrier 10 of the present invention is moveable, permitting outward extension, while still being connected to the vehicle, to provide unobstructed opening of the vehicle rear door or hatch and access to the interior vehicle cargo area. Subsequently, the carrier 10 may be inwardly retracted so that it is firmly disposed in an aerodynamically favorable position closely spaced to but not contacting the rear of the vehicle. The carrier 10 also preferably has an aerodynamically favorable configuration which minimizes drag and conserves power and fuel usage.

Figure 1:
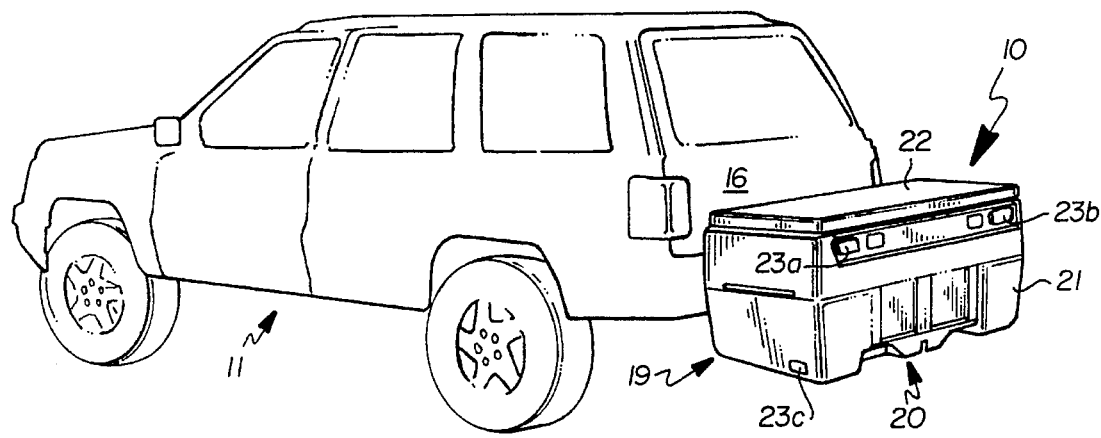
FIG. 1 is a perspective view of the vehicle cargo carrier apparatus of the present invention operatively attached to a vehicle.
Figure 2:
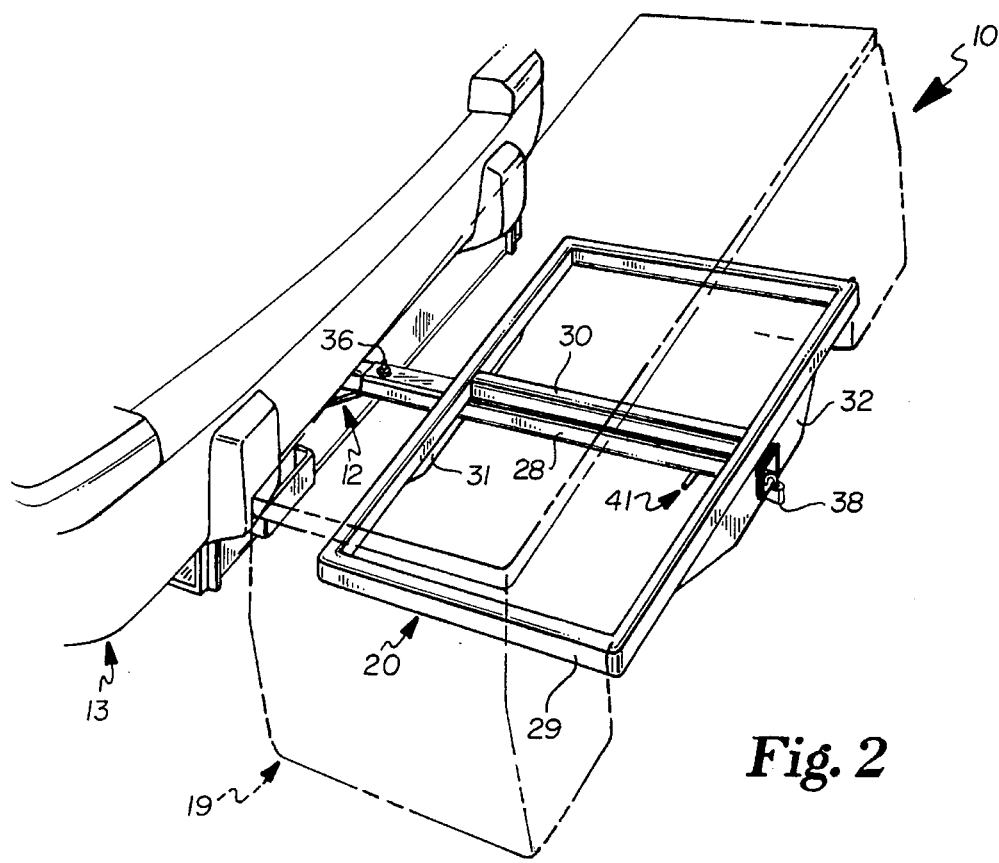
FIG. 2 is a perspective view of the support system of the cargo carrier apparatus, shown in a retracted position.
Figure 7:
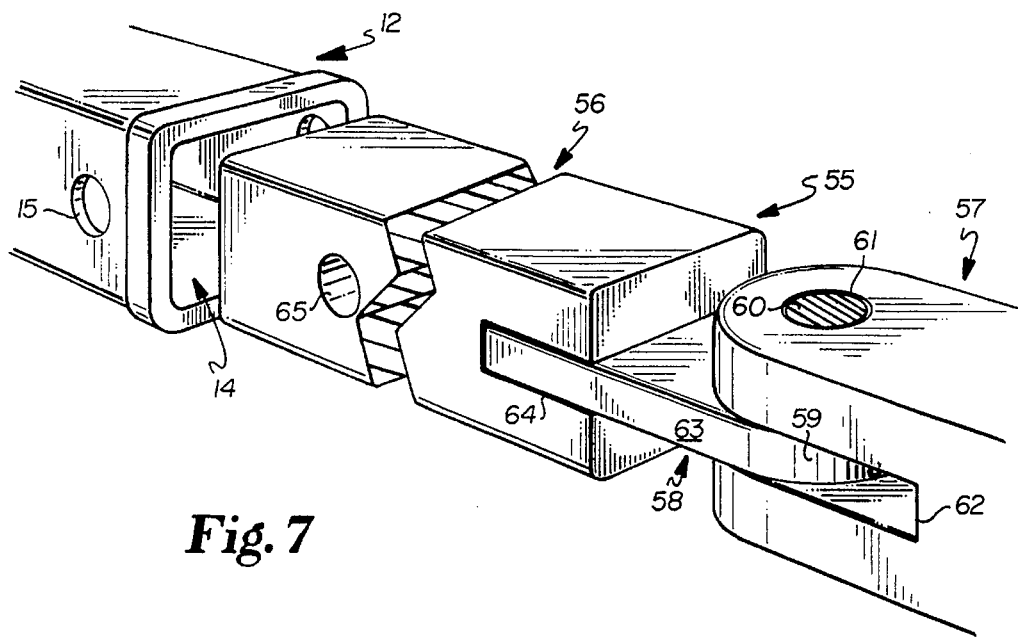
FIG. 7 is a perspective view of another embodiment of a support system member.
Figure 8:
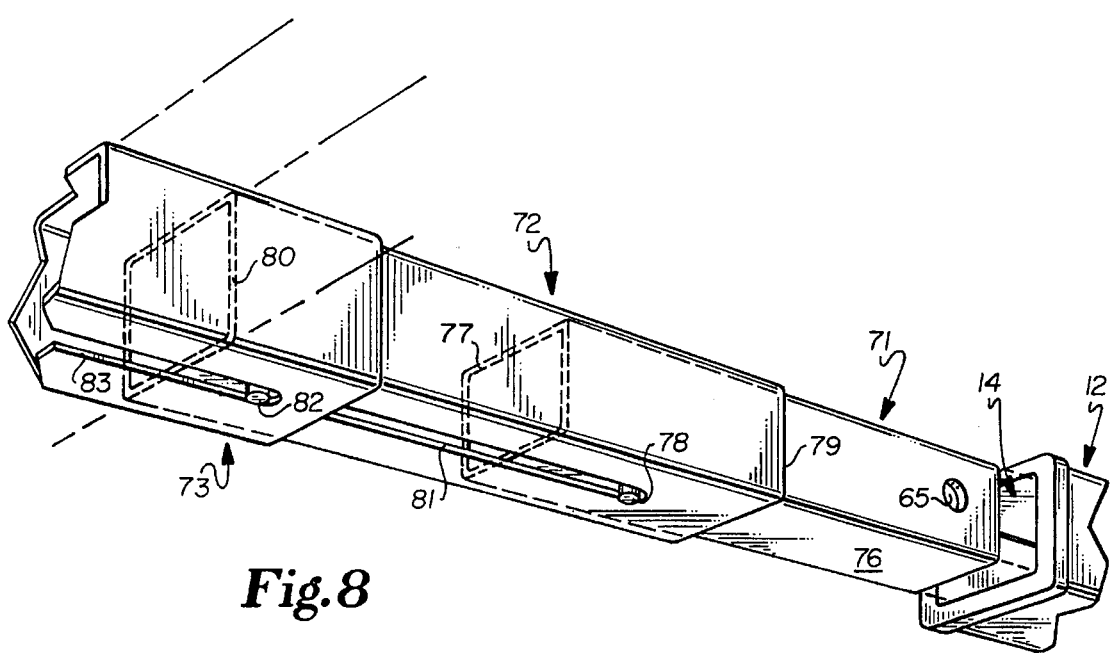
FIG. 8 is a perspective view of yet another embodiment of a support system member.

Referring to FIGS. 1 and 2, the carrier 10 is connected to the rear end of a vehicle 11, for example a sport utility vehicle having a outwardly opening hatch 16. Referring also to FIGS. 7 and 8, the carrier 10 is connected to the vehicle via a well known and commonly used receiver-style trailer hitch 12 of the type having a substantially square tubular member with an open central space or channel 14, which also has a substantially square configuration. In the instant example, the hitch 12 is disposed centrally with respect to the rear of the vehicle 11, under the rear bumper 13. Typically, such hitches 12 have at least one connection aperture 15 though which a connection pin (not shown) is disposed for locking a trailer or other member to the hitch 12.

The carrier 10 essentially comprises a connection member 18 which interfaces with the hitch 12, a frame member 20 which interfaces with the connection member 18, and a box or container member 19 which is connected to the frame member 20. The box member 19 preferably has one or more rear safety lights 23a, b and c communicatively connected to the electrical system of the vehicle 11 via a wiring harness 25. Additionally, a safety chain 24 of a predetermined type and length preferably connects the frame of the carrier 10 to the vehicle hitch 12 and also the carrier 10 box to the frame.

Figure 3:
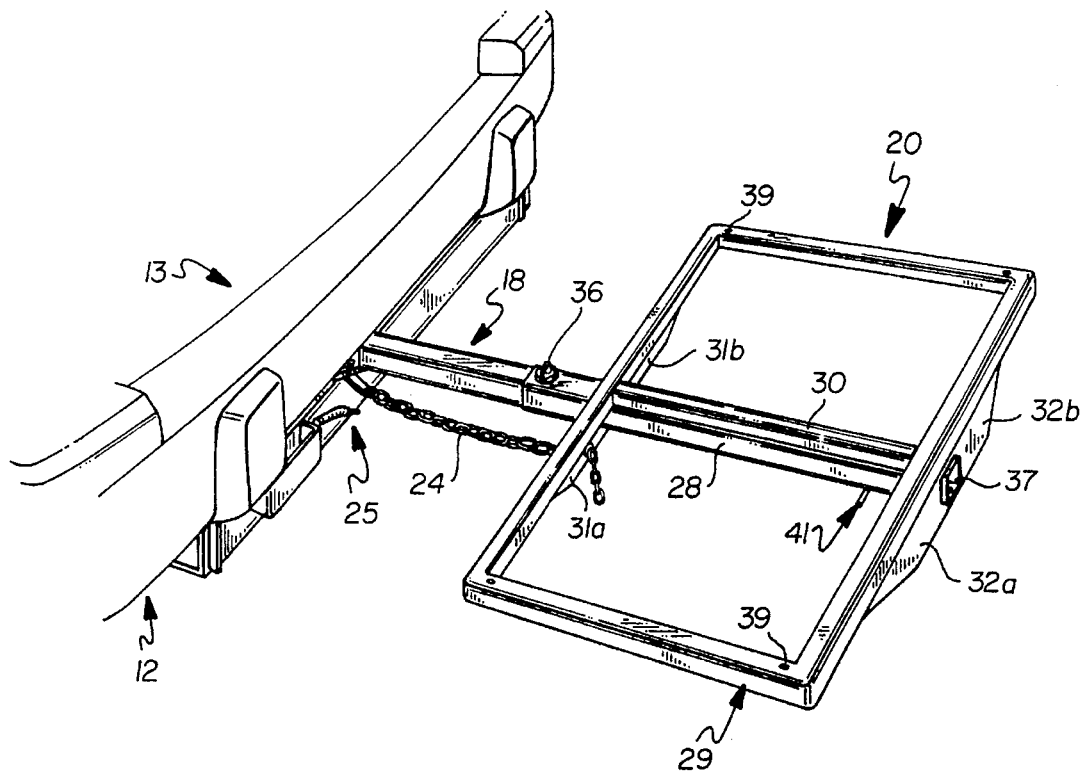
FIG. 3 is a perspective view of the support system shown in an extended position.
Figure 4:
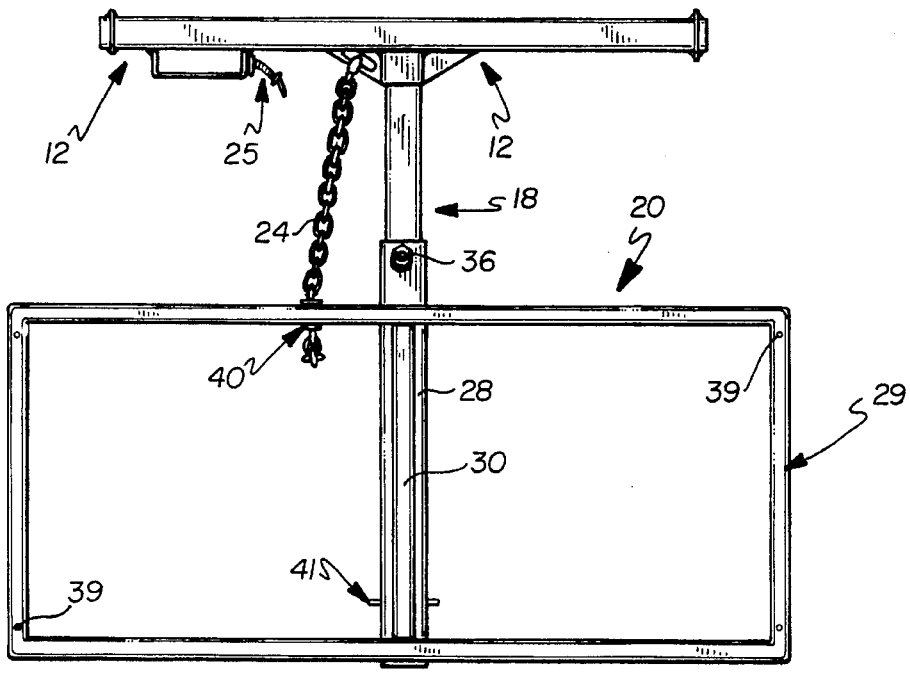
FIG. 4 is a top or plan view of the support system, also shown in an extended position.
Figure 5:
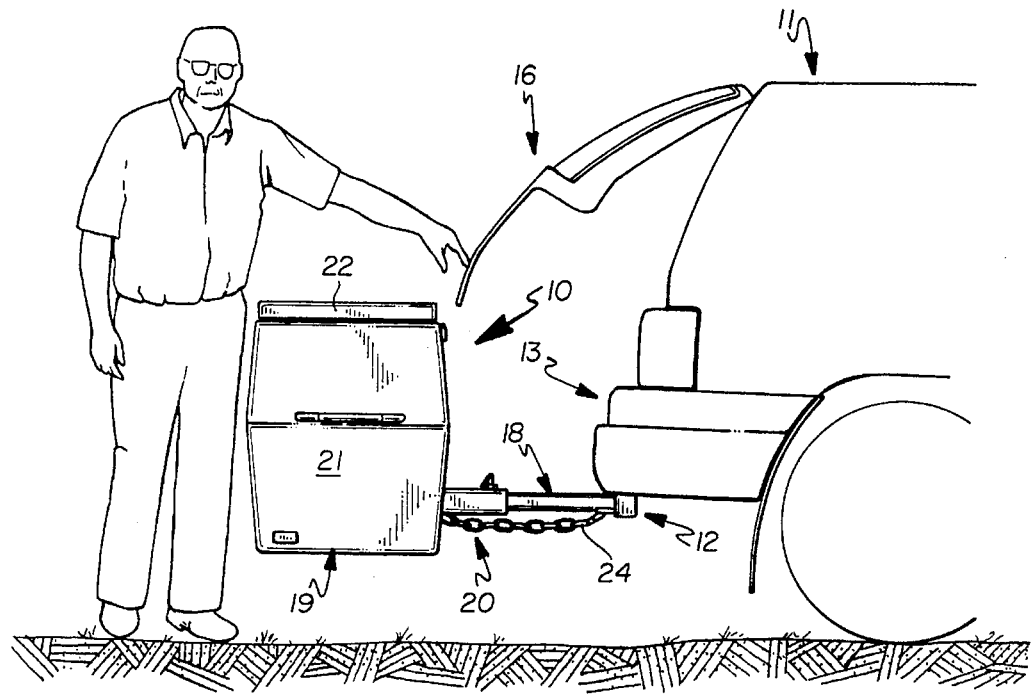
FIG. 5 is side view of the cargo carrier attached to a vehicle and shown in an extended position to allow unrestricted access to the rear hatch and interior cargo area of the vehicle.
Figure 6:
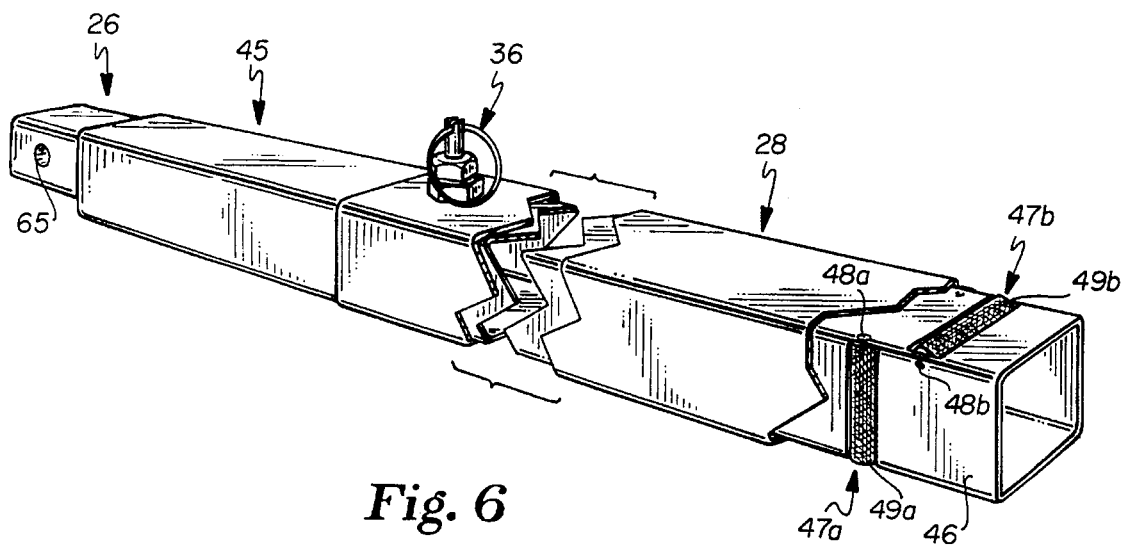
FIG. 6 is a perspective view of an embodiment of a support system member, partially in crossection and partially cut away, to show various internal features and components thereof.

Referring to FIGS. 3–5, the connection member 18 is inserted into the hitch 12 when in an operative orientation. The connection member 18 is a straight, somewhat elongated, bar shaped structure with a hollow interior and which has external dimensions such that it is mateable with the interior of the hitch 12 and with a predetermined portion of the frame member 20 as is described further below. The connection member 18 is preferably formed of hollow 3⁄16th inch thick, 2 inch outside dimension (OD) square metal steel or aluminum stock. Referring also to FIG. 6, preferably for a 1¼ inch hitch, the proximal end 26 of the member 18 is solid and has a rectangular outside dimension of 1¼ inches. Alternatively, the entire length of the connection member may be 1¼ inch OD. For 2 inch hitches, the entire length of the connection member 18 is 2 inch OD. The connection member 18 has a preferred length of approximately 29 inches for a Jeep Grand Cherokee. This length has been found to provide optimal strength and stability characteristics as well as an optimal amount of extension of the box member 19 away from the rear of the vehicle 11 for purposes of opening the rear door or hatch 16, and providing access to the vehicle interior therethrough, as is best shown in FIG. 5. Preferably, the connection member 18 has a horizontally aligned aperture or apertures (not shown) disposed a predetermined short distance from its proximal or inwardly disposed end to permit locking of the connection member 18 proximal end in the hitch via pin, shaft or bolt through apertures 15 (See FIG. 7) of the hitch 12. Additionally, the connection member 18 has a vertically disposed connection aperture (not shown) disposed at a position whereby it is spaced a short distance from the distal end of the connection member 18.

The frame member 20 basically comprises a receiving member 28, a peripheral support frame 29, a central support member 30, and front and rear braces 31 and 32, respectively. The receiving member 28 is slidably connected to the connection member 18. The peripheral support frame is fixed to the top of the receiving member 28 and supports the cargo box 19. The central support member 30 is connected to the top of the receiving member 28 and supports the box 19. The front and rear braces 31 and 32 also strengthen the support frame 29 and its connection to the receiving member 28.

The receiving member 28 is slidably inserted over the connection member 18 when in an operative orientation. The receiving member 28 is a straight, some what elongated, bar shaped structure with a hollow interior and which has internal dimensions such that it is mateable with the exterior of the connection member 18. The receiving member 28 is preferably formed of ¼ inch thick, 2 inch ID seamless metal steel or aluminum stock. 1¼ inch ID stock may be used where a 1¼ inch OD connection member is provided with the carrier 10. The receiving member 28 has a preferred length of approximately 21.5 inches, a length which has been found to provide optimal strength, stability, and box 19 extension characteristics, as well as a support for a preferred storage box size and capacity. The receiving member 28 has a spring biased safety pin assembly 36 disposed on its top surface a predetermined distance from its proximal end. The fail safe safety pin assembly 36 comes into mating connection with the connection aperture (not shown) at the distal end of the connection member 18 in the event that the operator fails to lock and chain the carrier whereby the receiving member 28 vibrates and slides rearwardly. When intended, the carrier 10 is easily and quickly extended and retracted. FIGS. 3–5 show the frame member 20 in an extended position for access to the vehicle 11 interior through the open door or hatch 16. FIGS. 1 and 2 show the frame member 20 in a retracted position and ready for travel. In this position, the carrier 10 is in an aerodynamically favorable position closely spaced with respect to the vehicle 11. Additionally, the carrier 10 does not obstruct the rear view of the vehicle operator during travel. Finally, in the retracted position, the carrier 10 is firmly held in position a predetermined position, approximately 0.25 inches, away from the vehicle bumper 13 so that the bumper 13 and the carrier 10 do not contact and cause abrasion of each other during travel. Referring to FIG. 3, the receiving member 28 further has a lock connection aperture 37 disposed proximate its distal or outward end and in the bottom surface. In a locking mode as shown in FIG. 2, where the frame member 20 is retracted for travel, the lock connection aperture 37 is aligned with a complementary aperture (not shown) at the distal end of the connection member 18 so that both apertures mate with a standard pad lock 38 to lock the carrier assembly 10 together. In this mode, the carrier 10 is secure from theft and unintended extension. Finally, a securement screw 41 is preferably disposed on the bottom of the receiving member 28, proximate its distal end. The securement screw 41 has a set screw design with a hand operable knob or T-Bar configuration. The screw 41 engages the interiorly disposed connection member 18 along a range of points to more firmly fix the position of the receiving member 28.

Referring again to FIGS. 2–4, the peripheral support frame 29 is connected to the receiving member 28. The support frame 29 is a rectilinear structure and preferably rectangular, with a peripheral dimension sufficient to connect to and support the box member 19. An optimal dimension for the box 19 shown, has been found to be approximately 36 inches wide and 17 inches deep. The support frame 29 is preferably constructed of 1⁄8th inch thick, 1 inch OD, 11 gauge, square metal steel or aluminum stock. The frame 29 is preferably formed by welding straight pieces of stock together at their ends to form the corners of the rectangular frame 29. Apertures 39 are formed in the frame 29, approximately 2.5 inches from each corner in the short side members thereof. The apertures 39 are for connection of the box member 19 to the frame 29 via screws or bolts (not shown).

The central support member 30 supports the central portion of the box member 19. The support member 30 is constructed of the same stock as that which forms the support frame 29. The support member 30 is fixed to the top surface of the receiving member 28, between the long side members of the frame 29.

The front and rear braces 31a and b and 32a and b strengthen the frame 29 and its connection to the receiving member 28. The braces 31 and 32 are preferably constructed of ³⁄₁₆th inch thick, flat metal steel or aluminum stock and are welded to the bottom of the frame 29 and to the receiving member 28. Each brace segment 31a and b and 32a and b is approximately 12 inches in length and has a rectilinear configuration.

Referring to FIGS. 1, 2 and 5, the box or container member 19 is for storage of articles such as luggage, gear, equipment or game. The box member 19 is shown to have an overall generally rectilinear configuration with curvilinear aspects or portions which enhance aerodynamic function. The box member 19 is disposed on top of the frame member 20, preferably as shown, and is attached thereto via connection screws or bolts cooperating with the connection apertures 39. The box member 19 has a body 21, preferably with a central recess area to which the frame 29 is attached, at least one top/rear opening lid 22. The box member 19 configuration and/or its attachment to the frame 20 may be modified, consistent with the teachings of the invention, to change the clearance between the carrier 10 and the ground. These structures are preferably constructed of a plastic material such as polyethylene. This construction provides a light weight, weather-tight, corrosion resistant unit with an aerodynamic configuration. An exemplary box member 19 is the approximately 13.3 cubic foot capacity Dual Lid Packer manufactured by Delta Consolidated Industries, Inc. of Jonesboro, Ark.

Referring to FIG. 6, an alternative embodiment of the connection member 45 provides improved carrier extension and retraction performance and comprises a straight, elongated, bar shaped body 46 with a hollow interior and which has external dimensions substantially equivalent to that of the connection member 18 discussed above and shown in FIGS. 3–5. The body 46 has a plurality of bearings 47 (only *a* and *b* shown), preferably three (3), disposed at its distal or outwardly extended end. The bearings 47 permit the receiving member 28 to be smoothly slidingly moved over the connection member 45 during extension and retraction of the carrier 10. The bearings 47 are preferably cylindrical structures which are disposed in channels 49a, b, . . . n and are rotatable about pins or shafts 48a, b, . . . n mounted in the body 46. As shown, the bearings 47a, b, . . . n protrude a predetermined slight distance above the surface of the body 46 for rotatable contact with the sliding receiving member 28.

Referring to FIG. 7, an alternative embodiment of the connection member 55 provides an improved range of carrier movement, in an extended position, through a pivotal structure. This is particularly useful with vehicles having vertically hinged doors. The connection member 55 generally comprises a first or proximal member 56, a second or distal member 57 and a connector 58. The proximal member 56 has a predetermined length and is insertable in the interior channel or lumen 14 of the hitch 12. The proximal member 56 has a rectilinear slot 64 of a predetermined dimension at its distal end. The connector 58 has a flat configuration of a predetermined dimension with a rectilinear proximal end and a curvilinear distal end. The connector 58 is fixedly attached to the distal end of the proximal member 56 via the slot 64. The distal member 57 has a slot 62 of a predetermined dimension at its proximal end. The distal end of the connector 58 is mated to the slot 62 and pivotally held therein, in a horizontal plane, via a pin or shaft 60 which is vertically oriented and extends through aligned apertures 61 in the distal member 57 and through a corresponding aperture (not shown) in the connector 58. The aforementioned structure permits the distal member 57 to horizontally pivot and move laterally with respect to the proximal member 56, and thus the hitch 12 in which the proximal member 56 is inserted, when the receiving member 28 is extended and the structure is not encased by the member 28. Pivotal movement of the distal member 57 permits an added range of movement of the box member 19 away from the vehicle door or hatch 16. The structure is stabilized and pivotal movement of the distal member 57 is restrained when the receiving member 28 is retracted to encase the structure.

Referring to FIG. 8, an alternative embodiment of the carrier which permits an increased longitudinal movement distance for extension of the box member 19. The embodiment comprises a first or proximal connection member 71, a second or distal connection member 72, each of a predetermined length, and a modified receiving member 73. Each of these structures are preferably constructed of square metal stock with a hollow interior. The proximal connection member 71 proximal and distal ends 76 and 77, respectively, and a predetermined outside dimension such that the proximal end 76 of the proximal connection member 71 is internally mateable within the hitch 12. A guide pin 78 of a predetermined cylindrical configuration is disposed on the bottom of the proximal connection member 71, centrally and a predetermined distance from the distal end 77 thereof. The distal connection member 72 has proximal and distal ends 71 and 72, respectively, and a hollow interior with a predetermined inside dimension such that the proximal end thereof is externally mateable over the distal end 77 of the proximal connection member 71. The distal connection member 72 has a generally centrally disposed, longitudinally oriented guide slot 81 on its bottom surface. The guide slot 81 has a predetermined lateral dimension and length, and cooperates with the guide pin 78 to control movement of the distal connection member 72 with respect to the proximal connection member 71. The distal connection member 72 further has a guide pin 82 of a predetermined cylindrical configuration disposed centrally on its bottom surface a predetermined distance from the distal end 80 thereof. The distal connection member 72 has a predetermined outside dimension such that the distal end 80 thereof is interiorly mateable within the proximal end of the receiving member 73. The receiving member 73 also has a generally centrally disposed, longitudinally oriented guide slot 83 on its bottom surface. The guide slot 83 has a predetermined lateral dimension and length, and cooperates with the guide pin 82 to control movement of the receiving member 73 with respect to the distal connection member 72. The aforementioned telescoping two-part connection member assembly provides an increased extensible travel distance.

The descriptions above and the accompanying drawings should be interpreted in the illustrative and not the limited sense. While the invention has been disclosed in connection with the preferred embodiment or embodiments thereof, it should be understood that there may be other embodiments which fall within the spirit and scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

The invention claimed is:

1. A cargo carrier for attachment to the rear portion of a vehicle via a receiver-type trailer hitch of the type having a substantially square tubular configuration with an open central channel, comprising:
   (a) a connection member for attachment to the vehicle trailer hitch, said connection member having a predetermined configuration, said connection member having a bar structure which is horizontally pivotal, said bar structure being of a predetermined length and having predetermined outside dimensions which are substantially equivalent to inside dimensions of the trailer hitch central channel, said connection member further having a proximal end for insertion into vehicle trailer hitch central channel and an opposing distal end;
   (b) a frame member slidably attached to said connection member; and
   (c) a box member attached to said frame member.

2. The carrier of claim 1, wherein said connection member proximal end has a solid reduced dimension portion.

3. The carrier of claim 1, wherein said connection member has at least one hitch connection aperture disposed a predetermined distance from its proximal end for locking the connection member to the vehicle trailer hitch, said connection member further having at least one frame connection aperture disposed at a predetermined location, said at least one frame connection aperture facilitating a locking connection with said frame member.

4. The carrier of claim 1, wherein said connection member has at least one bearing for facilitating sliding movement of said frame member therewith.

5. The carrier of claim 4, wherein there are a plurality of bearings disposed a predetermined distance from said connection member distal end, a top bearing being disposed on a top surface, and at least one side bearing being disposed on a side surface.

6. The carrier of claim 1, wherein said connection member has a first bar portion of a predetermined length, a connection tab fixed to a distal end of said first bar portion, and a second bar portion of a predetermined length and which is horizontally pivotally attached to a distal end of said connection tab via a pivot shaft, whereby said second bar portion is horizontally pivotal with respect to said first bar portion.

7. The carrier of claim 1, further comprising a second connection member slidably connected to said connection member, said second connection member having a hollow interior and being telescopingly inserted over said connection member.

8. The carrier of claim 7, wherein said connection member has an alignment pin, wherein said second connection member has an alignment pin and alignment slot which is cooperatively mated with said connection member alignment pin, and wherein said frame member has an alignment slot which is cooperatively mated with said second connection member alignment pin.

9. The carrier of claim 1, wherein said frame member includes a receiving member which is telescopingly slidably connected to said connection member and a box support member attached to said receiving member.

10. The carrier of claim 9, wherein said receiving member is a straight bar structure of a predetermined length and having a proximal end for sliding insertion over said connection member and an opposing distal end, said bar structure having predetermined inside dimensions which are substantially equivalent to outside dimensions of said connection member.

11. The carrier of claim 10, wherein said receiving member bar structure is a hollow, approximately ¼ inch thick, 1¼ to 2 inch inside dimension square metal stock.

12. The carrier of claim 10, wherein said receiving member has a spring biased locking pin disposed on a top surface a predetermined distance from its proximal end for emergency mating connection with said first frame connection aperture on said connection member, said receiving member further having a locking aperture disposed on a bottom surface a predetermined distance from its distal end, said locking aperture being for lock receiving alignment with said second frame connection aperture of said connection member.

13. The carrier of claim 9, wherein said box support member is a rectilinear frame structure of predetermined peripheral dimensions and having means to secure said box member to a top surface thereof.

14. The carrier of claim 1, wherein said box member has predetermined dimensions and includes a body and has a rear opening top lid pivotally attached thereto.

15. The carrier of claim 1, further comprising a safety chain coupling said frame member to the vehicle hitch.

16. An adjustable, extensible cargo carrier for attachment to the rear portion of a vehicle via a receiver-type trailer hitch having a rectilinear tubular configuration with an open central channel of a predetermined length, comprising:
   (a) a stationary, non-extensible connection member for attachment to the vehicle trailer hitch, said connection member having a straight bar structure of a predetermined length and having a proximal end which is fully inserted, fixed and locked into the vehicle trailer hitch channel and an opposing distal end extending rearwardly from the vehicle, said bar structure having predetermined outside dimensions which are substantially equivalent to inside dimensions of the trailer hitch channel, said bar structure proximal end further having a reduced outside dimension;
   (b) a frame member slidably attached to said connection member, said frame member including a receiving member slidably connected to said connection member and a box support member attached to said receiving member, said receiving member having a straight, hollow bar structure of a predetermined length and having a proximal end for insertion over said connection member and an opposing distal end, said bar structure having predetermined inside dimensions which are substantially equivalent to outside dimensions of said connection member, said receiving member further having a hand operable locking set screw member disposed at said distal end, said set screw member being adapted to engage said connection member in said hollow receiving member and lock it in position therein, said receiving member being telescopingly slidable over said connection member, whereby said frame member is positionable on said stationary connection member with respect to the rear portion of the vehicle and is easily locked in position via said hand operable locking set screw member; and
   (c) a box member attached to said box support member, said box member having predetermined dimensions and including a body and at least one top lid pivotally attached thereto.

17. The carrier of claim 16, further comprising a spring biased locking pin disposed on a top surface of said receiving member a predetermined distance from its proximal end and a locking pin receiving aperture disposed on said connection member proximate its distal end, whereby said locking pin being establishes emergency mating connection with said locking pin receiving aperture and secures said frame member in position on said connection member in the event that said frame member should inadvertently move rearwardly a predetermined distance towards said connection member distal end.

* * * * *